United States Patent
Kaiduka et al.

(10) Patent No.: US 8,053,112 B2
(45) Date of Patent: Nov. 8, 2011

(54) NON-AQUEOUS ELECTROLYTE BATTERY AND METHOD OF MANUFACTURING THE SAME

(75) Inventors: Atsushi Kaiduka, Moriguchi (JP); Yasunori Baba, Moriguchi (JP); Naoki Imachi, Moriguchi (JP); Yoshinori Kida, Moriguchi (JP); Shin Fujitani, Moriguchi (JP)

(73) Assignee: SANYO Electric Co., Ltd., Osaka (JP)

( * ) Notice: Subject to any disclaimer, the term of this patent is extended or adjusted under 35 U.S.C. 154(b) by 1210 days.

(21) Appl. No.: 11/723,184

(22) Filed: Mar. 16, 2007

(65) Prior Publication Data

US 2007/0218369 A1 Sep. 20, 2007

(30) Foreign Application Priority Data

Mar. 17, 2006 (JP) ................................. 2006-074558

(51) Int. Cl.
*H01M 4/13* (2010.01)
*H01M 4/60* (2010.01)
*H01M 4/58* (2010.01)

(52) U.S. Cl. .... 429/215; 429/209; 429/213; 429/231.95
(58) Field of Classification Search .................. 429/209, 429/213, 215, 216, 231.95
See application file for complete search history.

(56) References Cited

U.S. PATENT DOCUMENTS

| | | | | |
|---|---|---|---|---|
| 6,053,953 | A * | 4/2000 | Tomiyama et al. | 29/623.1 |
| 6,355,379 | B1 * | 3/2002 | Ohshita et al. | 429/304 |
| 6,444,355 | B1 * | 9/2002 | Murai et al. | 429/144 |
| 7,105,251 | B2 * | 9/2006 | Miyaki et al. | 429/218.1 |
| 7,682,751 | B2 * | 3/2010 | Kato et al. | 429/246 |

FOREIGN PATENT DOCUMENTS

| | | |
|---|---|---|
| JP | 2002-141042 A | 5/2002 |
| JP | 2004-185920 A | 7/2004 |
| JP | 2005-50779 | 2/2005 |
| JP | 2006-278235 A | 10/2006 |

* cited by examiner

*Primary Examiner* — Patrick Ryan
*Assistant Examiner* — Julian Anthony
(74) *Attorney, Agent, or Firm* — Kubovcik & Kubovcik

(57) ABSTRACT

A non-aqueous electrolyte secondary battery includes a positive electrode having a positive electrode active material layer containing a positive electrode active material, a negative electrode having a negative electrode active material, a separator interposed between the positive electrode and the negative electrode, an electrode assembly comprising the positive electrode, the negative electrode, and the separator, and a non-aqueous electrolyte impregnated in the electrode assembly. The positive electrode active material contains at least cobalt or manganese. The positive electrode has an end-of-charge potential of 4.40 V versus the potential of a lithium reference electrode. The positive electrode active material layer is superficially coated with a polymer layer composed of a polymer having a partially cross-linked structure and a molecular weight of 800,000 or greater.

19 Claims, 4 Drawing Sheets

NON-AQUEOUS ELECTROLYTE BATTERY AND METHOD OF MANUFACTURING THE SAME

BACKGROUND OF THE INVENTION

1. Field of the Invention

The present invention relates to improvements in non-aqueous electrolyte secondary batteries, such as lithium-ion batteries, and more particularly to, for example, a battery structure that is excellent in cycle performance and storage performance under high-temperature conditions and that exhibits high reliability even with a high power battery design.

2. Description of Related Art

Mobile information terminal devices such as mobile telephones, notebook computers, and PDAs have become smaller and lighter at a rapid pace in recent years. This has led to a demand for higher capacity batteries as the drive power source for the mobile information terminal devices. With their high energy density and high capacity, lithium-ion batteries that perform charge and discharge by transferring lithium ions between the positive and negative electrodes have been widely used as the driving power sources for the mobile information terminal devices.

The mobile information terminal devices tend to have higher power consumption according to the functions of the devices, such as a moving picture playing function and gaming functions. It is strongly desired that the lithium-ion batteries that are the drive power source for the devices have further higher capacities and higher performance in order to achieve longer battery life and improved output power.

Under these circumstances, research and development efforts to provide lithium-ion batteries with higher capacities have been underway. These efforts center around attempts to reduce the thickness of the battery can, the separator, or positive and negative electrode current collectors (e.g., aluminum foils or copper foils), as disclosed in Japanese Published Unexamined Patent Application No. 2002-141042, which are not involved in the power generating element, as well as attempts to increase the filling density of active materials (improvements in electrode filling density). These techniques, however, seem to be approaching their limits, and fundamental improvements such as finding alternative materials have become necessary to achieve a greater capacity in lithium-ion batteries. Nevertheless, regarding attempts to increase the battery capacity through alternative positive and negative electrode active materials, there are few candidate materials for positive electrode active materials that are comparable or superior to the state-of-the-art lithium cobalt oxide in terms of capacity and performance, although alloy-based negative electrodes with Si, Sn, etc. as negative electrode active materials appear to be promising.

Under these circumstances, we have developed a battery with an increased capacity by raising the end-of-charge voltage of the battery, using lithium cobalt oxide as the positive electrode active material, from the currently common 4.2 V to a higher region to increase the utilization depth (charge depth). The reason why such an increase in the utilization depth can achieve a higher battery capacity may be briefly explained as follows. The theoretical capacity of lithium cobalt oxide is about 273 mAh/g, but a battery rated at 4.2 V (the battery with an end-of-charge voltage of 4.2 V) utilizes only up to about 160 mAh/g, which means that it is possible to increase the battery capacity up to about 200 mAh/g by raising the end-of-charge voltage to 4.4 V. Raising the end-of-charge voltage to 4.4 V in this way accomplishes about a 10% increase in the overall battery capacity.

When lithium cobalt oxide is used at a high voltage as described above, the oxidation power of the charged positive electrode active material increases. Consequently, decomposition of the electrolyte solution is accelerated, and moreover, the delithiated positive electrode active material itself loses stability of the crystal structure. Accordingly, most important issues to be resolved have been the cycle life deterioration and the performance deterioration during storage due to crystal disintegration. We have already found that addition of zirconia, aluminum, or magnesium to lithium cobalt oxide can achieve comparable performance to the 4.2 V battery even at a higher voltage under room temperature conditions. However, as recent mobile devices require higher power consumption, it is essential to ensure battery performance under high-temperature operating conditions so that the battery can withstand continuous operation in high temperature environments. For this reason, there is an imminent need to develop technology that can ensure sufficient battery reliability even under high temperature conditions, not just under room temperature conditions.

It has been found that the positive electrode of a battery with an elevated end-of-charge voltage loses stability of the crystal structure and shows a considerable battery performance deterioration especially at high temperature. Although the details are not yet clear, there are indications of decomposition products of the electrolyte solution and dissolved elements from the positive electrode active material (dissolved cobalt in the case of using lithium cobalt oxide) as far as we can see from the results of an analysis, and it is believed that these products and elements are the primary causes of the deterioration in cycle performance and storage characteristics under high temperature conditions.

In particular, in the battery system that employs a positive electrode active material composed of lithium cobalt oxide, lithium manganese oxide, lithium-nickel-cobalt-manganese composite oxide, or the like, high temperature storage causes the following problems. When stored at high temperature, cobalt or manganese dissociates into ions and dissolves away from the positive electrode, and subsequently, these elements deposit on the negative electrode and the separator as they are reduced at the negative electrode. This results in an increase in the battery internal resistance and the resulting capacity deterioration. Furthermore, when the end-of-charge voltage of the lithium-ion battery is raised as described above, the instability of the crystal structure is worsened, and the foregoing problems are exacerbated, so the foregoing phenomena tend to occur even at a temperature of about 50° C., where the battery rated at 4.2 V does not cause such problems. Moreover, these problems tend to worsen when a separator with a small film thickness and a low porosity is used.

For example, with a battery rated at 4.4 V that uses a lithium cobalt oxide positive electrode active material and a graphite negative electrode active material, a storage test (test conditions: end-of-charge voltage 4.4 V, storage temperature 60° C., storage duration 5 days) showed that the remaining capacity after the storage deteriorated considerably, in some cases as low as about zero. Following the disassembly of the tested battery, a large amount of cobalt was found in the negative electrode and the separator. Therefore, it is believed that the elemental cobalt that has dissolved away from the positive electrode accelerated the deterioration. The valency of the positive electrode active material that has a layered structure, such as lithium cobalt oxide, increases by the extraction of lithium ions. However, since tetravalent cobalt is unstable, the crystal structure thereof is unstable and tends to change into a more stable structure. This is believed to cause the cobalt ions to easily dissolve away from the crystals. It is also known that when a spinel-type lithium manganese oxide is used as the positive electrode active material as well, trivalent manganese becomes non-uniform, and dissolves away from the positive electrode as bivalent ions, causing the same problems as in the case of using lithium cobalt oxide as the positive electrode active material.

As described above, when the charged positive electrode active material has an unstable structure, performance deterioration during storage and cycle life degradation under high temperature conditions tend to be more evident. It is also known that this tendency is more evident when the filling density of the positive electrode active material layer is higher, so the problems are more serious in a battery with a high capacity design. It should be noted that even the physical properties of the separator, not just the negative electrode, are involved because, for example, by-products of the reactions produced from the positive and negative electrodes migrate through the separator to the opposite electrodes, further causing secondary reactions. Thus, it is believed that ion mobility and migration distance within the separator are greatly involved.

To overcome such problems, attempts have been made to prevent cobalt or the like from dissolving away from the positive electrode by, for example, physically coating the surface of the positive electrode active material particles with an inorganic substance, or by chemically coating the surface of the positive electrode active material particles with an organic substance, for example, a polymer of a cyclic aromatic hydrocarbon, or of a biphenyl or the like. However, in the case of a physical coating, since the positive electrode active material more or less expands and shrinks repeatedly during charge-discharge cycling, the advantageous effect resulting from the coating may be lost. On the other hand, in the case of a chemical coating, it is difficult to control the thickness of the coating film. If the thickness of the polymer layer is too large, the internal resistance of the battery increases, making it difficult to attain desired performance, and as a result, the battery capacity reduces. Moreover, there remains an issue that it is difficult to coat entire particles, limiting the advantageous effect resulting from the coating. Thus, there is a need for an alternative technique to the coating methods.

BRIEF SUMMARY OF THE INVENTION

Accordingly, it is an object of the present invention to provide a non-aqueous electrolyte battery that shows good cycle performance and good storage performance under high temperature conditions, and exhibits high reliability even with a battery configuration featuring high output power.

In order to accomplish the foregoing and other objects, the present invention provides a non-aqueous electrolyte secondary battery comprising: a positive electrode having a positive electrode active material layer comprising a positive electrode active material containing at least cobalt or manganese, the positive electrode having an end-of-charge potential of 4.40 V versus the potential of a lithium reference electrode; a polymer layer formed on a surface of the positive electrode active material layer, the polymer layer composed of a polymer having a partially cross-linked structure and a molecular weight of 800,000 or greater; a negative electrode having a negative electrode active material; a separator interposed between the positive electrode and the negative electrode; an electrode assembly comprising the positive electrode, the negative electrode, and the separator; and a non-aqueous electrolyte impregnated in the electrode assembly.

According to the present invention, the polymer layer provided on the surface of the positive electrode active material layer properly exhibits a filtering function. Thus, the polymer layer traps the decomposition products of the electrolyte solution resulting from the reaction at the positive electrode as well as the cobalt or manganese ions dissolved away from the positive electrode active material, preventing the cobalt or manganese from depositing on the negative electrode and the separator. As a result, damage to the negative electrode and the separator is alleviated, and therefore, an excellent advantageous effect is exhibited that deterioration in the cycle performance under high temperature conditions and deterioration in the storage performance under high temperature conditions can be lessened.

DETAILED DESCRIPTION OF THE INVENTION

Figure 1:
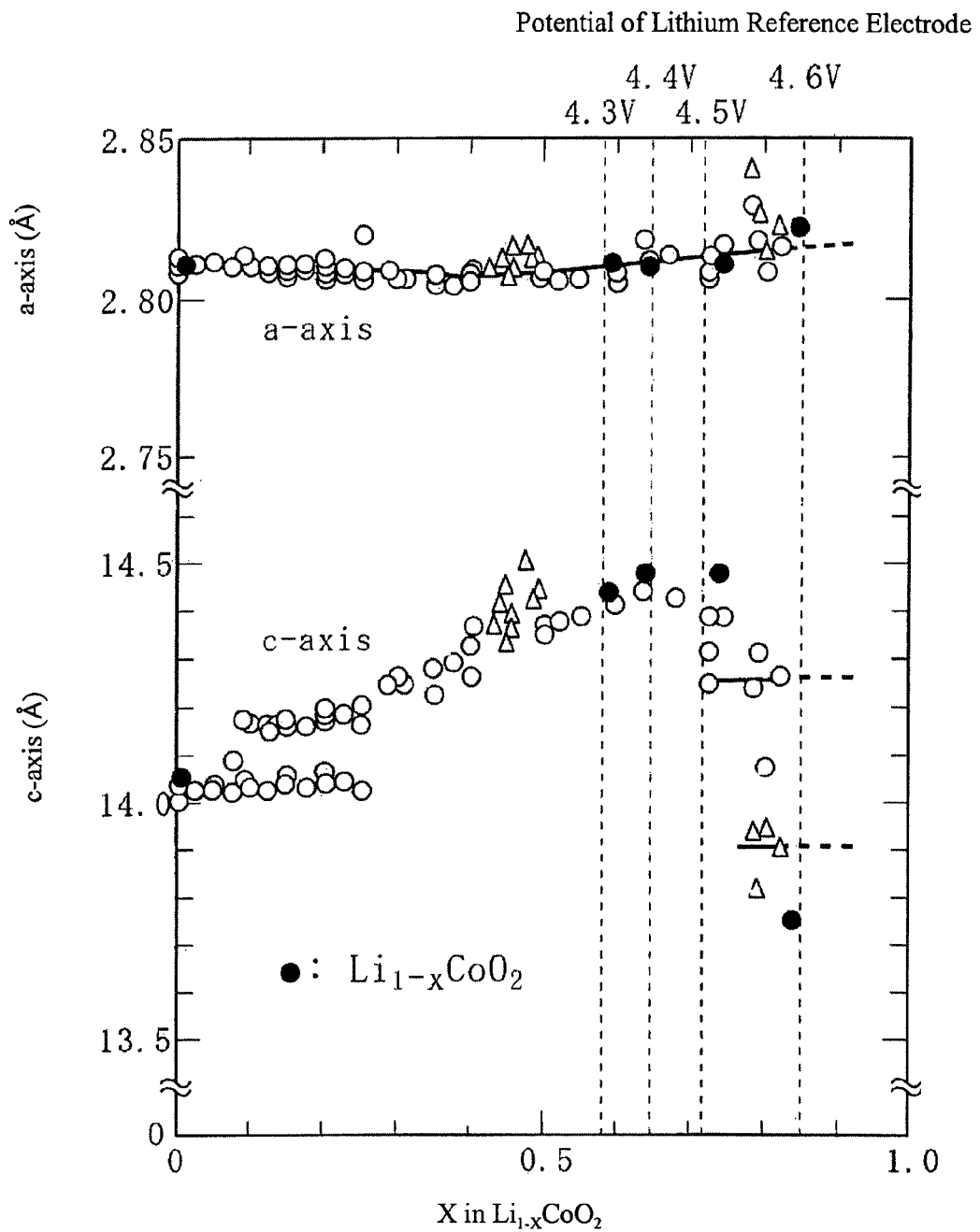
FIG. 1 is a graph illustrating the relationship between potential and change in crystal structure of lithium cobalt oxide.

A non-aqueous electrolyte secondary battery in accordance with the present invention comprises a positive electrode having a positive electrode active material layer, a negative electrode having a negative electrode active material, a separator interposed between the positive electrode and the negative electrode, an electrode assembly comprising the positive electrode, the negative electrode, and the separator; and a non-aqueous electrolyte impregnated in the electrode assembly. The positive electrode active material contains at least cobalt or manganese, and has an end-of-charge potential of 4.40 V versus the potential of a lithium reference electrode. A polymer layer is formed on a surface of the positive electrode active material layer. The polymer layer is formed from a polymer having a partially cross-linked structure and a weight average molecular weight in terms of polystyrene of 800,000 or greater. A "partially cross-linked structure" as referred to herein means a polymer having a ratio of crosslinking of from 5 to 25 wt %.

With the above-described configuration, the polymer layer disposed on the surface of the positive electrode active material layer properly exhibits a filtering function. Thus, the polymer layer traps the decomposition products of the electrolyte solution resulting from the reaction at the positive electrode as well as the cobalt or manganese ions dissolved away from the positive electrode active material, preventing the cobalt or manganese from depositing on the negative electrode and the separator. This makes it possible to alleviate damage to the negative electrode and the separator. Therefore, it is possible to lessen deterioration in the cycle performance under high temperature conditions and deterioration in the storage performance under high temperature conditions. Moreover, since the polymer layer is disposed on the surface of the positive electrode active material layer, not on the surface of the positive electrode active material particles (i.e., the polymer layer is coated over a large area), it is not difficult to control the thickness of the polymer layer. As a result, it is possible to prevent an increase in the internal resistance of the battery resulting from a polymer layer with a large thickness.

Here, the end-of-charge potential of the positive electrode is controlled to be 4.40 V or higher versus a lithium reference electrode potential. This is because whether the polymer layer is present or absent does not make much difference in high temperature performance for a battery in which the positive electrode is configured to be charged to less than 4.40 V versus a lithium reference electrode potential, whereas whether the polymer layer is present or absent leads to a considerable difference in high temperature performance with a battery in which the positive electrode is charged to 4.40 V or higher versus a lithium reference electrode potential.

Moreover, the polymer layer is restricted to one comprising a polymer having partially cross-linked structure and a molecular weight of 800,000 or greater. This is because a polymer having this kind of structure is less likely to dissolve into the electrolyte solution.

It is preferable that the polymer material for the polymer layer be a material that swells appropriately and forms a gel having ion conductivity upon absorbing the electrolyte solution, and it is necessary that the polymer material be contained in a small amount and the battery configuration be similar to that of an electrolyte battery, in order to obtain the advantageous effects of the invention without adversely affecting other battery characteristics. It is an essential requirement that the polymer should not dissolve in a large amount in the electrolyte solution, and it is essential that the polymer should have a large molecular weight or should contain monomer units having a low affinity with the electrolyte solution. In addition, obtaining insolubility by increasing the molecular weight is effective in terms of solubility. It is preferable to use a polymer material that causes a crosslinking reaction to proceed within the battery whereby the molecular weight increases, and it is essential to use a polymer material that can cause a crosslinking reaction other than by radical polymerization.

Herein, it is preferable that the polymer layer have a mass of $3.3\times10^{-4}$ g/cm$^2$ or less per unit area of the positive electrode active material layer.

If the polymer layer has a mass of greater than $3.3\times10^{-4}$ g/cm$^2$ per unit area of the positive electrode active material layer, the polymer layer formed has such a thickness that the internal resistance of the battery increases, and thereby a problem of discharge capacity deterioration may arise.

It is preferable that the product of separator thickness x (µm) and separator porosity y (%) be 1500 (µm·%) or less.

The reason why the pore volume of the separator is restricted to 1500 (µm·%) or less is as follows. A separator with a smaller pore volume is more susceptible to the adverse effects originating from the deposition products and the side reaction products, resulting in more significant performance degradation. Thus, by applying the present invention to a battery having a separator that is controlled to be within the above limitation, a remarkable advantageous effect can be exhibited.

It should be noted that such a battery may also achieve an improvement in energy density because such a battery accomplishes a separator thickness reduction.

It is preferable that the positive electrode active material layer has a filling density of 3.40 g/cc or greater, i.e., that the amount of the positive electrode active material (g) per cc of the positive electrode active material layer be 3.40 or greater.

The reason is as follows. When the filling density is less than 3.40 g/cc, the reaction in the positive electrode takes place over the entire electrode, not locally. Therefore, the deterioration of the positive electrode also proceeds uniformly and does not significantly affect the charge-discharge reactions after storage. On the other hand, when the filling density is 3.40 g/cc or higher, the reaction in the positive electrode is limited to local reactions in the outermost surface layer, and the deterioration of the positive electrode also mainly takes place in the outermost surface layer. This means that the intrusion and diffusion of lithium ions into the positive electrode active material during discharge become the rate-determining events, and therefore, the degree of the deterioration becomes large. Thus, the advantageous effects of the present invention are sufficiently exhibited when the positive electrode active material layer has a filling density of 3.40 g/cc or greater.

In addition, it is preferable that the positive electrode active material contain at least lithium cobalt oxide containing aluminum or magnesium in solid solution, and zirconia is firmly attached on the surface of the lithium cobalt oxide.

The reason for employing such a configuration is as follows. In the case of using lithium cobalt oxide as the positive electrode active material, as the charge depth increases, the crystal structure becomes more unstable and deterioration accelerates in a high temperature atmosphere. In view of this problem, alleviation of crystal strain in the positive electrode is attempted by allowing aluminum or magnesium to be contained in the positive electrode active material (inside the crystals) in the form of a solid solution. These elements contribute to the stabilization of the crystal structure but bring about degradation in the initial charge-discharge efficiency and a decrease in the discharge working voltage. In order to alleviate this problem, zirconia is firmly attached on the surface of lithium cobalt oxide.

In addition, it is preferable that the positive electrode have an end-of-charge potential of 4.45 V or higher versus the potential of a lithium reference electrode.

For the batteries with such a configuration, whether the polymer layer is present or absent makes a considerable difference in high temperature performance.

Further, it is preferable that the invention be applied to a battery that may be used in an atmosphere at 50° C. or higher.

The advantageous effects resulting from the present invention will be greater because the deterioration of the battery accelerates when used under an atmosphere at 50° C. or higher.

Hereinbelow, the present invention is described in further detail based on examples thereof. It should be construed, however, that the present invention is not limited to the following examples but various changes and modifications are possible without departing from the scope of the invention.

Preparation of Positive Electrode

First, lithium cobalt oxide (in which 1.0 mol. % of Al and 1.0 mol. % of Mg are contained in the form of a solid solution and 0.05 mol. % of Zr is electrically in contact with the surface) as a positive electrode active material, acetylene black as a carbon conductive agent, and PVdF as a binder agent were mixed together at a mass ratio of 95:2.5:2.5, and thereafter, the mixture was agitated together with NMP as a solvent, using a Combimix mixer made by Tokushu Kika, to thus prepare a positive electrode mixture slurry. Next, the resultant positive electrode slurry was applied onto both sides of a positive electrode current collector made of an aluminum foil, and the resultant material was then dried and pressure-rolled, whereby positive electrode active material layers were formed on both surfaces of the aluminum foil. The filling density of the positive electrode active material layer was controlled to be 3.60 g/cc.

Next, 3 mass % of a polymer of 3,4-epoxy cyclohexyl methacrylate (5 wt %), 3-ethyl oxetanyl methacrylate (19 wt %), methyl methacrylate (30 wt %), n-butyl acrylate (42 wt %) and p-lithium styrene sulfonate (4 wt %) and having a ratio of crosslinking monomers of 24 wt % which is the sum of 5 wt % of the 3,4-epoxy cyclohexyl methacrylate and 19 wt % of the 3-ethyl oxetanyl methacrylate and having a molecular weight of about 800,000 was dissolved in ethanol as a solvent, to prepare a polymer solution. Thereafter, the foregoing material in which the positive electrode mixture layer was formed on both sides of the aluminum foil was immersed in the polymer solution prepared in the just-described manner and then dried, to thus prepare a positive electrode having a polymer layer formed on the surface thereof. The just-described polymer layer had an amount of polymer coating of $1.73 \times 10^{-4}$ g/cm$^2$.

The molecular weight of the polymer was measured using a gel permeation chromatograph (GPC). Tetrahydrofuran was used as the solvent for the polymer. The molecular weight of the polymer was a weight average molecular weight in terms of polystyrene.

Preparation of Negative Electrode

A carbonaceous material (artificial graphite having a BET of 4.0 m$^2$/g and an average diameter of 20 μm), CMC (carboxymethylcellulose sodium), and SBR (styrene-butadiene rubber) were mixed in an aqueous solution at a mass ratio of 98:1:1 to prepare a negative electrode slurry. Thereafter, the negative electrode slurry was applied onto both sides of a copper foil serving as a negative electrode current collector, and the resultant material was then dried and pressure-rolled. Thus, a negative electrode was prepared. The filling density of the negative electrode active material layer was controlled to be 1.60 g/cc.

Preparation of Electrolyte Solution

A lithium salt composed mainly of LiPF$_6$ was dissolved at a concentration of 1.0 mole/L in a mixed solvent of 3:7 volume ratio of ethylene carbonate (EC) and diethyl carbonate (DEC) to prepare a non-aqueous electrolyte solution.

Type of Separator

A polyethylene (hereinafter also abbreviated as "PE") microporous film (average pore diameter 0.6 μm, film thickness 23 μm, porosity 48%) was used as the separator.

Construction of Battery

Lead terminals were attached to the positive and negative electrodes, which were wound in a spiral form with the separator interposed therebetween. The wound electrodes were then pressed into a flat shape to obtain an electrode assembly. Thereafter, the electrode assembly was accommodated into an enclosing space made by an aluminum laminate film serving as a battery case. Then, the non-aqueous electrolyte solution was filled into the space, and thereafter the battery case was sealed by welding the aluminum laminate film together, to thus prepare a battery. In this battery design, the end-of-charge voltage was controlled to be 4.4 V by adjusting the amounts of the active materials in the positive and negative electrodes, and moreover, the capacity ratio of the positive and negative electrodes (initial charge capacity of the negative electrode/initial charge capacity of the positive electrode) was controlled to be 1.08 at this potential. The above-described battery had a design capacity of 780 mAh.

EXAMPLES

Preliminary Experiment 1

Various coating methods were used for forming a polymer layer by applying a polymer solution on the positive electrode active material layer, to find what kind of coating method is suitable.

Coating Methods Used

Dip coating, gravure-coating, die coating, transfer coating, and spray coating were used for applying a polymer solution onto both sides of the positive electrode active material layer. Methanol and DMC were used for the solvents for preparing the polymer solution because these solvents have little influence on the positive electrode active material layer, are capable of drying in a short time, and have good wettability to the positive electrode active material layer.

Results of the Experiment

It was confirmed that the thickness of the coating and the amount of the coating could be varied by adjusting the concentration of the solid content of the polymer solution, and any of the coating methods was capable of obtaining the advantageous effects of the present invention as long as the amount of the coating was appropriate.

It was also confirmed that any type of solvent may be used as long as the solvent can be dried and removed after the coating. It should be noted that even a solvent having a lower wettability than methanol and DMC may be used when a different kind of positive electrode active material is used or when a surfactant is introduced.

Preliminary Experiment 2

An air permeability measurement test was conducted to study how much difference in the air permeability of the separator would be made depending on the type of separator.

Separators Used

In this experiment, various separators (each composed of a microporous film made of PE) were used having various pore diameters, film thicknesses, and porosities.

Details of the Experiment

[1] Measurement of Separator Porosity

Prior to the measurement for the separators as described below, the porosity of each separator was measured in the following manner.

First, a sample of the film (separator) was cut into a 10 cm×10 cm square, and the mass (W g) and the thickness (D cm) of the sample were measured. The mass of each of the materials within the sample was determined by calculation, and the mass of each of the materials [Wi (i=1 to n)] was divided by the absolute specific gravity, to assume the volume of each of the materials. Then, porosity (volume %) was determined using the following equation 1.

$$\text{Porosity}(\%) = 100 - \{(W1/\text{Absolute specific gravity } 1) + (W2/\text{Absolute specific gravity } 2) + \ldots + (Wn/\text{Absolute specific gravity } n)\}100/(100D) \quad \text{Eq. (1)}$$

The separator in the present invention, however, is made of PE alone, and therefore, the porosity thereof can be determined using the following equation (2).

$$\text{Porosity}(\%) = 100 - \{(\text{Mass of } PE/\text{Absolute specific gravity of } PE)\}100/(100D) \quad \text{Eq. (2)}$$

[2] Measurement of Air Permeability of Separators

This measurement was carried out according to JIS P8117, and the measurement equipment used was a B-type Gurley densometer (made by Toyo Seiki Seisaku-sho, Ltd.).

Specifically, the time it took for 100 cc of air to pass through a separator fastened to a circular hole (diameter: 28.6 mm, area: 645 mm$^2$) under a pressure supplied by an inner cylinder (mass: 567 g) was measured, and the value obtained was employed as the air permeability of the subject separator.

Results of the Experiment

TABLE 1

| | Separator | | | | | |
|---|---|---|---|---|---|---|
| Separator | Average pore diameter (μm) | Film thickness (μm) | Porosity (%) | Pore volume [Film thickness × Porosity] (μm %) | Air permeability [Air] (s/100 cc) | Battery applied |
| Separator S1 | 0.1 | 12 | 38 | 456 | 290 | Battery A2 of the invention; Comparative Batteries Z2, Y2, Y3, Y5, Y7, X2, X3, and X4 |
| Separator S2 | 0.1 | 16 | 47 | 752 | 190 | Comparative Battery Z3 |
| Separator S3 | 0.05 | 20 | 38 | 760 | 500 | Comparative Battery Z4 |
| Separator S4 | 0.6 | 18 | 45 | 810 | 110 | Comparative Battery Z5 |
| Separator S5 | 0.6 | 23 | 48 | 1104 | 85 | Batteries A1, B, and C of the invention; Comparative Batteries Z1, Y1, Y4, Y6, X1, and W |
| Separator S6 | 0.6 | 27 | 52 | 1404 | 90 | Comparative Battery Z6 |

As will be clearly understood from reviewing Table 1, when the average pore diameter of the separator is small, the air permeability tends to be poor (see, for example, the results for the separators S1 to S3). It should be noted, however, that a separator with a large porosity can prevent the air permeability from becoming poor, even when the separator has a small average pore diameter (compare separator S1 and separator S2). Moreover, it will also be recognized that when the film thickness of the separator is large, the air permeability tends to be poor (compare separator S5 and separator S6).

Preliminary Experiment 3

As has been discussed in the Background of the Invention, although the use of lithium cobalt oxide as the positive electrode active material is preferable in order to achieve a battery with a higher capacity, problems also exist. In order to resolve or alleviate the problems, various elements were added to lithium cobalt oxide to find what kind of element is suitable.

Preconditions in Selecting Additive Element

Prior to selecting additive elements, the crystal structure of lithium cobalt oxide was analyzed. The result is shown in FIG. 1 [reference: T. Ozuku et. al, J. Electrochem. Soc. Vol. 141, 2972 (1994)].

As will be clearly seen from FIG. 1, it has been found that the crystal structure (particularly the crystal structure along the c-axis) is greatly disintegrated when the positive electrode is charged to about 4.5 V or higher versus the potential of the lithium reference electrode (to a battery voltage of 4.4 V or higher, since the battery voltage is about 0.1 V lower than the potential of the lithium reference electrode). Thus, it has been recognized that the crystal structure of lithium cobalt oxide becomes more unstable as the charge depth increases. In addition, it has also been found that the deterioration accelerates when exposed in a high temperature atmosphere.

Details of Selection of Additive Elements

As a result of assiduous studies, we have found that, in order to alleviate the disintegration of the crystal structure, it is very effective to cause Mg or Al to dissolve in the interior of the crystal to form a solid solution. Both Mg and Al are effective to substantially the same degree, but the later-described other battery characteristics are adversely affected to a lesser extent by Mg. For this reason, it is more preferable that Mg is dissolved in the form of a solid solution.

Although these elements contribute to the stabilization of the crystal structure, they may bring about degradation in the initial charge-discharge efficiency and a decrease in the discharge working voltage. For the purpose of alleviating these problems, the present inventors conducted experiments assiduously and as a result found that the discharge working voltage is significantly improved by adding a tetravalent or pentavalent element, such as Zr, Sn, Ti, or Nb to lithium cobalt oxide according to the method described in Japanese Kokai No. 2005-50779 which is incorporated herein by reference. An analysis was conducted for lithium cobalt oxides to which a tetravalent or pentavalent element was added, and it was found that such an element existed on the surfaces of the lithium cobalt oxide particles, and basically, they did not form a solid solution with lithium cobalt oxide, but were kept in the state of being electrically in contact directly with the lithium cobalt oxide. Although the details are not yet clear, it is believed that these elements serve to significantly reduce the interface charge transfer resistance, which is the resistance of the interface between the lithium cobalt oxide and the electrolyte solution, and that this contributes to the improvement in the discharge working voltage.

However, in order to ensure the state in which the lithium cobalt oxide and the additive element are directly electrically in contact with each other, it is necessary to sinter the material after the additive element material is added. In this case, among the above-mentioned elements, Sn, Ti, and Nb usually serve to inhibit crystal growth of the lithium cobalt oxide and therefore tend to lower the safety of the lithium cobalt oxide itself (when the crystallite size is small, the safety tends to be poor). However, Zr was found to be advantageous in that it does not impede crystal growth of lithium cobalt oxide and moreover it improves the discharge working voltage.

Thus, it was found preferable that when using lithium cobalt oxide at 4.3 V or higher, particularly at 4.4 V or higher versus the potential of a lithium reference electrode, Al or Mg should be dissolved in the interior of the crystal of the lithium cobalt oxide in order to stabilize the crystal structure of the lithium cobalt oxide, and moreover, Zr having a diameter of 0.1~3.0 µm should be directly electrically in contact with the surface of the lithium cobalt oxide particles in order to compensate for the performance degradation resulting from dissolving Al or Mg in the lithium cobalt oxide to form a solid solution.

It should be noted that the proportions of Al, Mg, and Zr to be added are not particularly limited.

Preconditions for the Later-Described Experiments (Operating Environment)

As previously discussed in the Background of the Invention, mobile devices have required higher capacity, higher power batteries in recent years. In particular, mobile telephones tend to require more power consumption as more advanced functions such as full color images, moving pictures, and gaming have been required. Currently, with a greater number of functions provided for such advanced mobile telephones, it has been desired that batteries used as the power source for the mobile telephones should have a higher capacity. Nevertheless, the improvements in battery performance have not reached that far, so the users are often compelled to use the mobile phones for watching TV programs or playing video games while charging the batteries simultaneously. Under such circumstances, the batteries are used constantly in a fully charged state, and also a high power is consumed. Consequently, the use environment often results in a temperature of 50° C. to 60° C.

In this way, the use environment for the mobile telephones have changed greatly along with the technological advancements of the mobile telephones, from the environment with only voice calls and electronic mails to the one with moving pictures and video games, and accordingly, the batteries have been demanded to guarantee a wide operating temperature range from room temperature to about 50-60° C. Also, increasing the capacity and raising the output power particularly are accompanied by a large amount of heat generated in the interior of the battery, and the operating environment of the battery also tends to be in a high temperature range, so it is necessary to ensure the battery reliability under high temperature conditions.

In view of these circumstances, we have devoted a great deal of effort to improvements in the battery performance as determined by a cycle test under environments at 40° C. to 60° C. and a storage test under a 60° C. atmosphere. More specifically, conventional storage tests have had the implications of an accelerated test for storage at room temperature; however, as the capabilities of the materials have been utilized to their limits as a result of the advancements in battery performance, the implications of the accelerated test for storage at room temperature have gradually faded, and the emphasis of the tests has shifted to a durability test close to the real use level. In view of these situations, we have decided to study the differences between the present invention and the conventional technology in storage tests in a charged state (a storage test at 80° C. for 4 days for the batteries designed to have an end-of-charge voltage of 4.2 V, and a storage test at 60° C. for 5 days for the batteries designed to have a higher end-of-charge voltage, since the higher the end-of-charge voltage of the fabricated battery is, the more severe the conditions of the deterioration).

It should be noted that in the following description the examples of the present invention are divided into five groups so that the advantageous effects of the invention can be readily understood.

First Group of Examples

Various separators were used to investigate the relationship between the physical properties of the separator and the storage performance in a charged state, with the end-of-charge voltage and the filling density of the positive electrode active material layer being fixed at 4.40 V and 3.60 g/cc, respectively, and the physical properties of the polymer layer formed on the surface of the positive electrode active material layer (the molecular weight of the polymer and the amount of the polymer) also being fixed. The results are set forth below.

Example A1

A battery prepared in the manner described in the above embodiment was used for Example A1.

The battery fabricated in this manner is hereinafter referred to as Battery A1 of the invention.

Example A2

A battery was fabricated in the same manner as described in Example A1 above, except that a PE microporous film having an average pore diameter of 0.1 µm, a film thickness of 12 µm, and a porosity of 38% was used as the separator.

The battery fabricated in this manner is hereinafter referred to as Battery A2 of the invention.

Comparative Example Z1

A battery was fabricated in the same manner as described in Example A1 above, except that no polymer layer was provided for the positive electrode.

The battery fabricated in this manner is hereinafter referred to as Comparative Battery Z1.

Comparative Example Z2

A battery was fabricated in the same manner as described in Comparative Example Z1 above, except that a PE microporous film having an average pore diameter of 0.1 µm, a film thickness of 12 µm, and a porosity of 38% was used as the separator.

The battery fabricated in this manner is hereinafter referred to as Comparative Battery Z2.

Comparative Example Z3

A battery was fabricated in the same manner as described in Comparative Example Z1 above, except that a PE microporous film having an average pore diameter of 0.1 µm, a film thickness of 16 µm, and a porosity of 47% was used as the separator.

The battery fabricated in this manner is hereinafter referred to as Comparative Battery Z3.

Comparative Example Z4

A battery was fabricated in the same manner as described in Comparative Example Z1 above, except that a PE microporous film having an average pore diameter of 0.05 µm, a film thickness of 20 µm, and a porosity of 38% was used as the separator.

The battery fabricated in this manner is hereinafter referred to as Comparative Battery Z4.

Comparative Example Z5

A battery was fabricated in the same manner as described in Comparative Example Z1 above, except that a PE microporous film having an average pore diameter of 0.6 µm, a film thickness of 18 µm, and a porosity of 45% was used as the separator.

The battery fabricated in this manner is hereinafter referred to as Comparative Battery Z5.

Comparative Example Z6

A battery was fabricated in the same manner as described in Comparative Example Z1 above, except that a PE microporous film having an average pore diameter of 0.6 μm, a film thickness of 27 μm, and a porosity of 52% was used as the separator.

The battery fabricated in this manner is hereinafter referred to as Comparative Battery Z6.

Experiment

Figure 2:
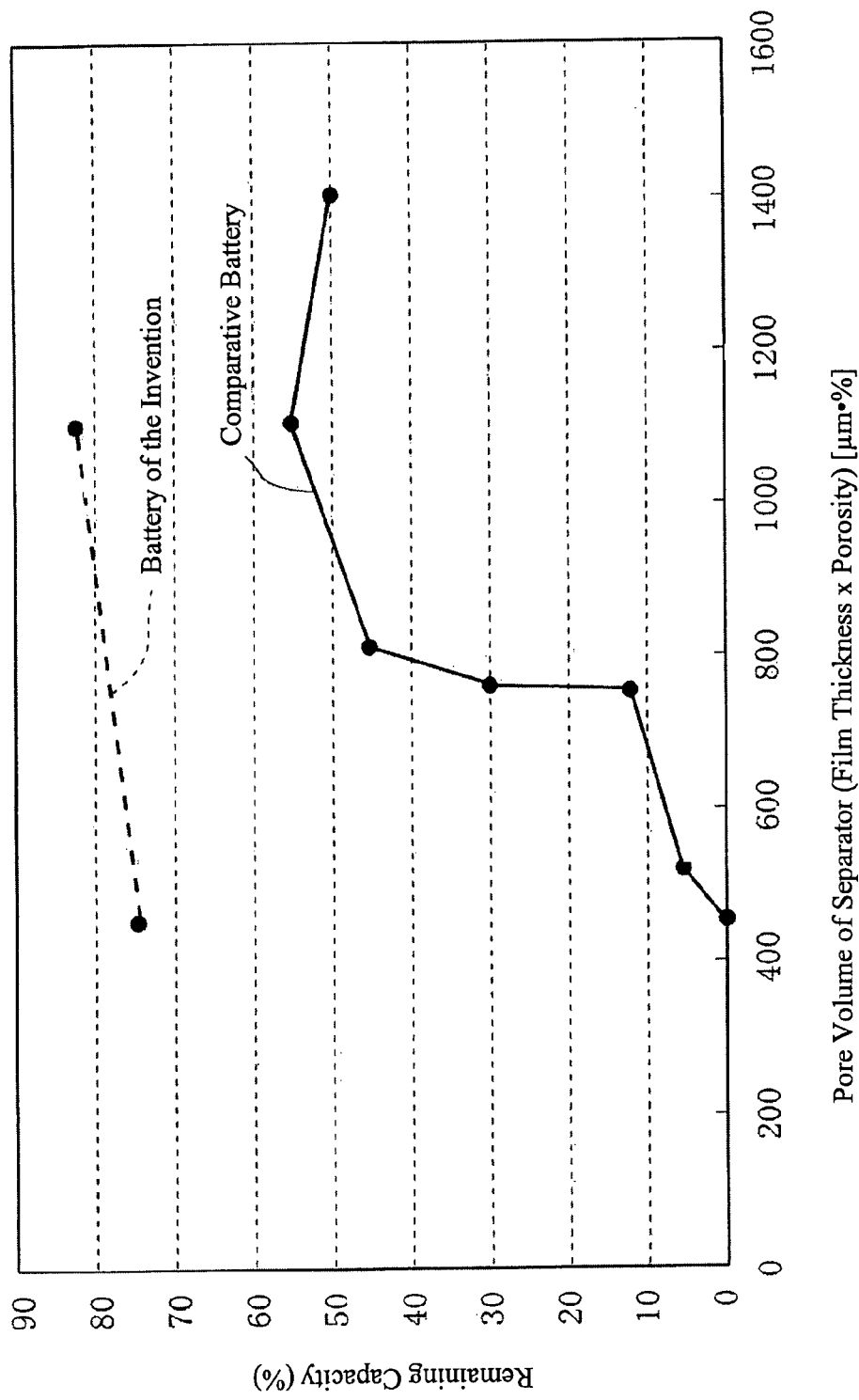
FIG. 2 is a graph illustrating the relationship between remaining capacities and separator pore volumes after storage in a charged state.

The storage performance in a charged state (the remaining capacity after storage in a charged state) was studied for each of Batteries A1 and A2 as well as Comparative Batteries Z1 to Z6. The results are shown in Table 2 below. Based on the results obtained, correlation between the physical properties of the separator and the remaining capacity after storage in a charged state was also studied. The results are shown in FIG. 2. The charge-discharge conditions and storage conditions were as follows.

Charge-Discharge Conditions
—Charge Conditions

Each of the batteries was charged at a constant current of 1.0 It (750 mA) until the battery voltage reached a predetermined voltage (i.e., the designed voltage of the battery, 4.40 V for all the batteries in the present experiment), and thereafter charged at the predetermined voltage until the current value reached 1/20 It (37.5 mA).

—Discharge Conditions

Each of the batteries was discharged at a constant current of 1.0 It (750 mA) until the battery voltage reached 2.75 V.

The interval between the charge and the discharge was 10 minutes.

Storage Conditions

Each of the batteries was charged and discharged one time according to the above-described charge-discharge conditions, and was again charged according to the charge conditions specified above to the predetermined voltage. Then, each of the charged batteries was set aside at 60° C. for 5 days.

Determination of Remaining Capacity

Each of the batteries was cooled to room temperature and discharged under the same conditions as the above-described discharge conditions, to measure the remaining capacity. Using the discharge capacity obtained at the first time discharge after the storage test and the discharge capacity obtained before the storage test, the remaining capacity was calculated using the following equation (3).

Remaining capacity(%)=Discharge capacity obtained at the first-time discharge after storage test/Discharge capacity obtained before storage test×100.   Eq. (3)

Analysis (1) Analysis on the Advantage of the Provision of the Polymer Layer As clearly seen from the results shown in Table 2, although in all the batteries the design voltage is 4.40 V and the positive electrode active material layer has a filling density of 3.60 g/cc, Batteries A1 and A2 of the invention, in which the polymer layer is formed on the surface of the positive electrode active material layer, show significant improvements in remaining capacity over Comparative Batteries Z1 to Z6. The reason why such results were obtained will be detailed below.

There are possible causes of the deterioration in storage performance in a charged state, but taking into consideration that the positive electrode active material is used up to about 4.50 V versus a lithium reference electrode (the battery voltage [end-of-discharge voltage] is about 4.40 V, 0.1 V lower), the primary causes are believed to be as follows.

(I) Decomposition of the electrolyte solution in a strong oxidizing atmosphere due to the higher charge potential of the positive electrode.

(II) Deterioration due to the structure of the charged positive electrode active material that becomes unstable.

Not only do these factors bring about the deterioration of the positive electrode and the electrolyte solution but they also affect the clogging of the separator and the deterioration of the negative electrode active material that result from the deposit on the negative electrode, particularly because of decomposition products of the electrolyte solution and dissolution of the elements from the positive electrode active material, which are believed to be due to the above (I) and (II). Although the details will be discussed later, the latter effect, the adverse effect on the separator and the negative electrode is believed to be significant, taking the present results into consideration.

For these reasons, it is believed that in Comparative Batteries Z1 to Z6 the decomposition products of the electrolyte solution and the cobalt or the like that has dissolved away from the positive electrode caused the clogging of the separator, or deposited on the negative electrode and caused the deterioration of the negative electrode active material, and consequently the remaining capacities reduced. In contrast, in Batteries A1 and A2 of the invention, furnished with the positive electrodes on which the polymer was formed, the decomposition products of the electrolyte solution and the Co or the like that has dissolved away from the positive electrode

TABLE 2

| | Separator | | | | Positive electrode | | | End-of-charge voltage | |
| | | | | | | Polymer layer | | Filling density | (Positive electrode | |
| Battery (Separator) | Average pore diameter (μm) | Film thickness (μm) | Porosity (%) | Pore volume [Film thickness × Porosity] (μm %) | Polymer layer formed | Molecular weight of polymer | Amount of polymer (mass %) | of positive electrode active material layer (g/cc) | potential verses potential of lithium reference electrode) (V) | Remaining capacity (%) |
|---|---|---|---|---|---|---|---|---|---|---|
| A2 (S1) | 0.1 | 12 | 38 | 456 | Yes | 800,000 | 3 | 3.60 | 4.40 | 75.0 |
| A1 (S5) | 0.6 | 23 | 48 | 1104 | | | | | (4.50) | 82.6 |
| Z2 (S1) | 0.1 | 12 | 38 | 456 | No | — | — | | | 0.1 |
| Z3 (S2) | 0.1 | 16 | 47 | 752 | | | | | | 12.2 |
| Z4 (S3) | 0.05 | 20 | 38 | 760 | | | | | | 30.2 |
| Z5 (S4) | 0.6 | 18 | 45 | 810 | | | | | | 45.5 |
| Z1 (S5) | 0.6 | 23 | 48 | 1104 | | | | | | 55.3 |
| Z6 (S6) | 0.6 | 27 | 52 | 1404 | | | | | | 50.2 | are trapped by the polymer layer, which prevents the decomposition products and the dissolved Co or the like from migrating to the negative electrode, then depositing and causing a reaction (deterioration), and consequently clogging the separator. In other words, the polymer layer exhibits a filtering function. It is believed that this filtering function serves to prevent degradation in the remaining capacity.

(2) Analysis on the Separators

Batteries A1 and A2 of the invention, which use the positive electrode having the polymer layer, achieve improvements in storage performance in a charged state, as described above, and when the film thickness of the separator is thinner, the degree of the improvement is greater. Moreover, when the pore volume of the separator (film thickness×porosity), which is one of the physical properties in which the film thickness is significantly involved, is used as an indicator, it is understood that the advantageous effects of the present invention become evident at about 800 ($\mu m \cdot \%$) or below.

The results are believed to be attributed to the following reasons.

Generally, when the film thickness of the separator is reduced, the porosity must also be reduced accordingly in order to compensate for the corresponding decrease in the mechanical strength. Accordingly, when the film thickness of the separator is reduced, the pore volume decreases. However, as described above, the decomposition products of the electrolyte solution and the elements dissolved away from the positive electrode, such as Co and Mn, deposit in the pores of the separator as well as on the negative electrode. As a consequence, in Comparative Batteries Z2 to Z4, which use the separators with smaller pore volumes, the clogging of the separators easily occurs, and the storage performance degrades considerably.

In contrast, in Battery A2 of the invention, the polymer layer exhibits a filtering function, and therefore, the decomposition products of the electrolyte solution and the Co or the like dissolved away from the positive electrode are trapped by the polymer layer. Thus, it is believed that even when the pore volume is small, clogging of the separator can be prevented, and as a result, the remaining capacity is prevented from decreasing.

It should be noted that since an increase in the film thickness of the separator directly results in a decrease in the energy density of the battery, it is generally preferred that the porosity is increased by increasing the average pore diameter while a certain degree of thickness (usually about 20 $\mu m$) is kept.

As a result of our assiduous studies, it has been found that the conditions of the separator that may be used when using a positive electrode in which the polymer layer is formed are as follows.

(I) When the film thickness of the separator is excessively large, the energy density of the battery decreases. Therefore, the separator must have a film thickness such that an appropriate energy density can be ensured.

(II) When the porosity of the separator is excessively large, the strength of the battery degrades. Therefore, the separator must have such a porosity that an appropriate strength of the separator can be maintained.

From the foregoing conditions (I) and (II), we have found that the pore volume of the separator that can be used in the present invention is 1500 ($\mu m \cdot \%$) or less, as determined by the expression: Film thickness×Porosity.

(3) Conclusion

From the foregoing results, it is demonstrated that in the batteries rated at 4.4 V, the battery that has a positive electrode having a polymer layer formed thereon can achieve a significant improvement in storage performance in a charged state, irrespective of the physical properties of the separator.

In order to obtain this advantageous effect effectively and efficiently, it is desirable that the pore volume of the separator be 1500 ($\mu m \cdot \%$) or less, and particularly preferably 800 ($\mu m \cdot \%$) or less.

Second Group of Examples

The end-of-charge voltage was varied to investigate the relationship between the end-of-charge voltage and the storage performance in a charged state, using two types of the separator (S1 and S5), with the filling density of the positive electrode active material layer being fixed at 3.60 g/cc and the physical properties of the polymer layer formed on the surface of the positive electrode active material layer (the molecular weight of the polymer and the amount of the polymer) also being fixed. The results are set forth below.

Comparative Example Y1

A battery was fabricated in the same manner as described in Comparative Example Z1 in the First Group of Examples, except that the battery was designed to have an end-of-charge voltage of 4.20 V and to have a capacity ratio between the positive and negative electrodes of 1.08 at that potential.

The battery fabricated in this manner is hereinafter referred to as Comparative Battery Y1.

Comparative Example Y2

A battery was fabricated in the same manner as described in Comparative Example Z1 in the First Group of Examples, except that the battery was designed to have an end-of-charge voltage of 4.30 V and to have a capacity ratio between the positive and negative electrodes of 1.08 at that potential.

The battery fabricated in this manner is hereinafter referred to as Comparative Battery Y2.

Comparative Example Y3

A battery was fabricated in the same manner as described in Comparative Example Z1 in the First Group of Examples, except that the battery was designed to have an end-of-charge voltage of 4.35 V and to have a capacity ratio between the positive and negative electrodes of 1.08 at that potential.

The battery fabricated in this manner is hereinafter referred to as Comparative Battery Y3.

Comparative Example Y4

A battery was fabricated in the same manner as described in Example A2 in the First Group of Examples, except that the battery was designed to have an end-of-charge voltage of 4.20 V and to have a capacity ratio between the positive and negative electrodes of 1.08 at that potential.

The battery fabricated in this manner is hereinafter referred to as Comparative Battery Y4.

Comparative Example Y5

A battery was fabricated in the same manner as described in Comparative Example Y4 above, except that no polymer layer was provided for the positive electrode.

The battery fabricated in this manner is hereinafter referred to as Comparative Battery Y5.

Comparative Example Y6

A battery was fabricated in the same manner as described in Comparative Example Z2 in the First Group of Examples, except that the battery was designed to have an end-of-charge voltage of 4.30 V and to have a capacity ratio between the positive and negative electrodes of 1.08 at that potential.

The battery fabricated in this manner is hereinafter referred to as Comparative Battery Y6.

Comparative Example Y7

A battery was fabricated in the same manner as described in Comparative Example Z2 in the First Group of Examples, except that the battery was designed to have an end-of-charge voltage of 4.35 V and to have a capacity ratio between the positive and negative electrodes of 1.08 at that potential.

The battery fabricated in this manner is hereinafter referred to as Comparative Battery Y7.

Experiment

The storage performance in a charged state (remaining capacity after storage in a charged state) was studied for Comparative Batteries Y1 to Y7. The results are shown in Table 3 below. Table 3 also shows the results for Batteries A1 and A2 of the invention and Comparative Batteries Z1 and Z2.

Figure 3:
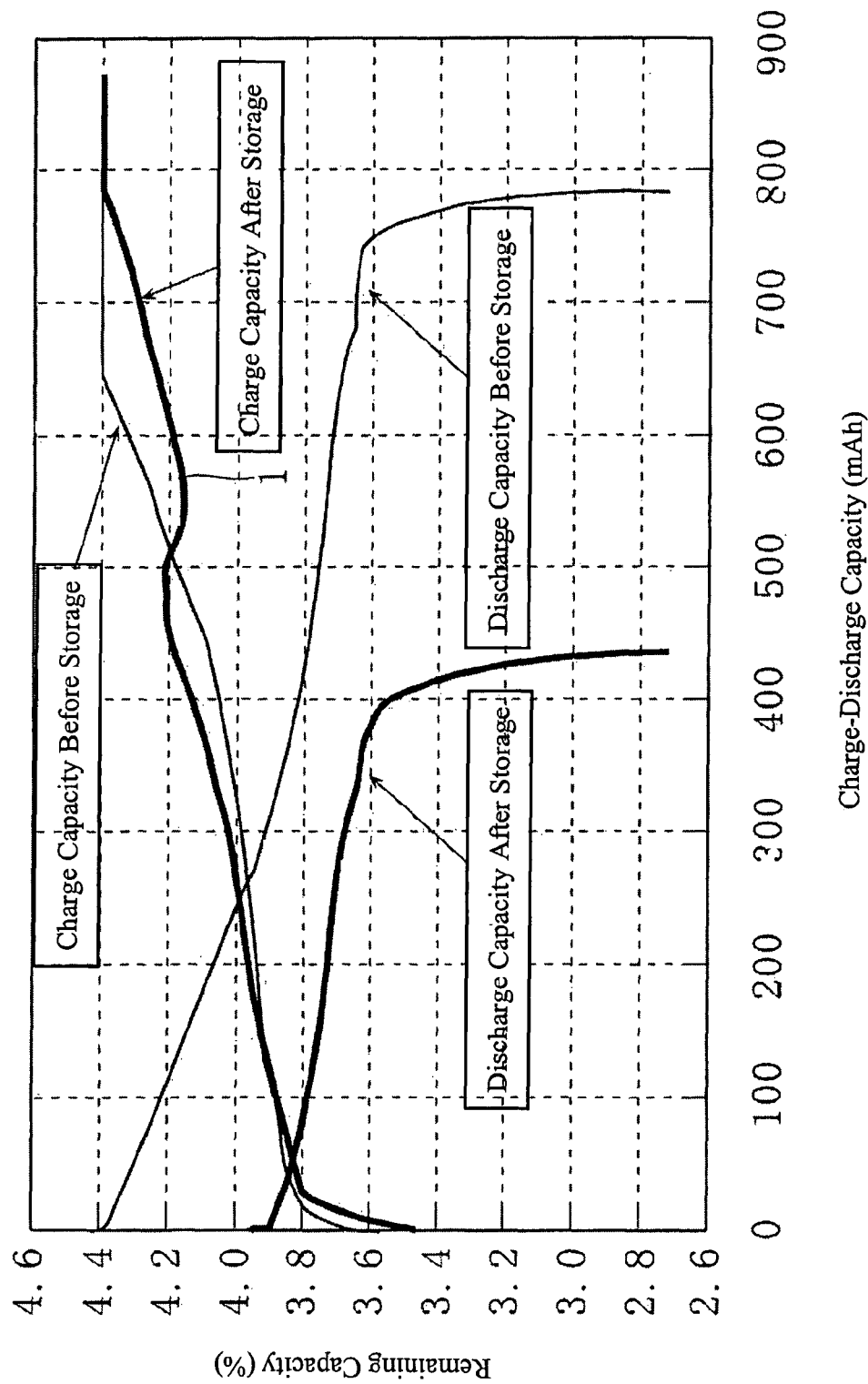
FIG. 3 is a graph illustrating the relationship between charge-discharge capacity and battery voltage in Comparative Battery Z2.
Figure 4:
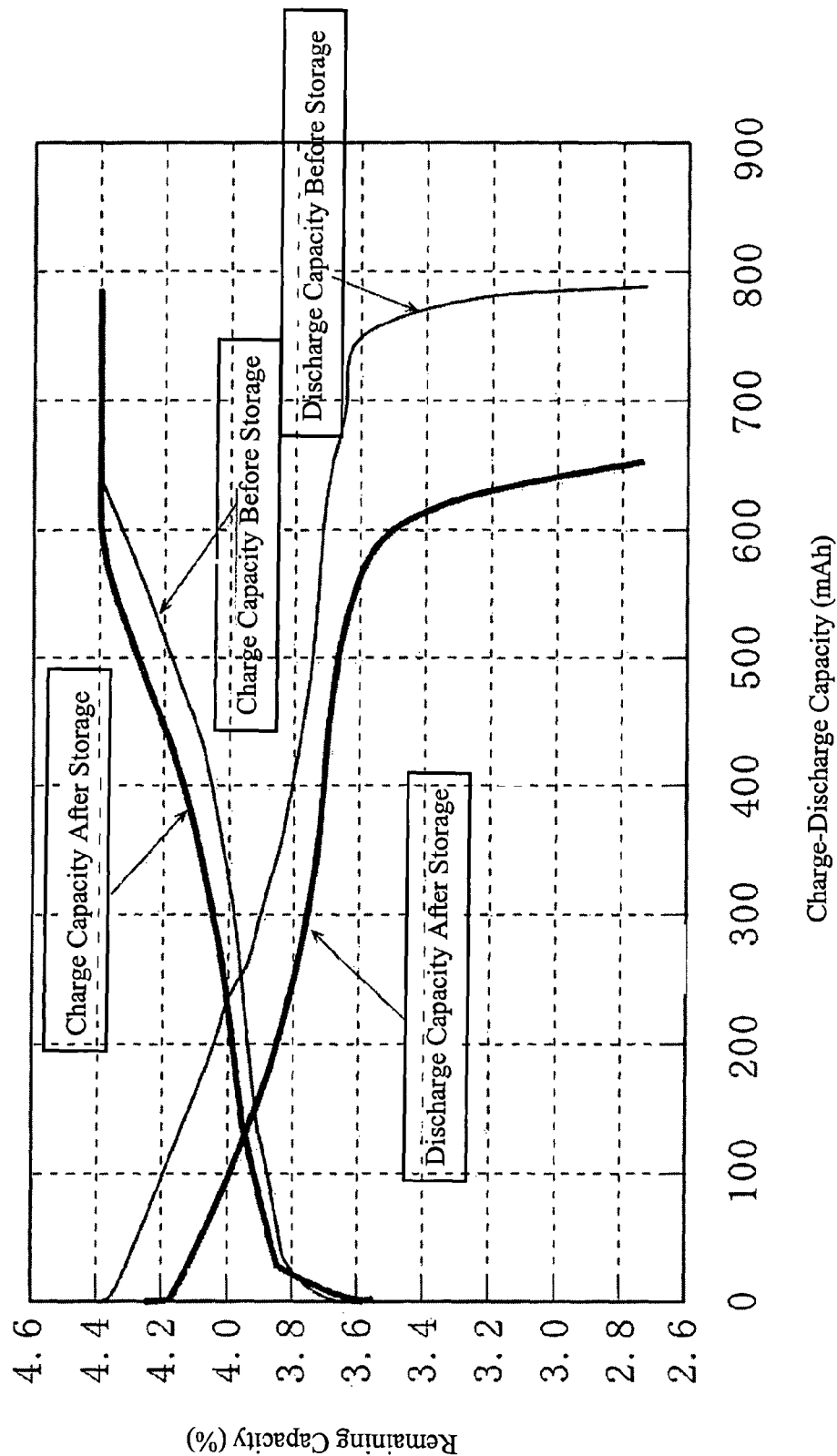
FIG. 4 is a graph illustrating the relationship between charge-discharge capacity and battery voltage in Battery A2 of the invention.

In addition, as representative examples, the charge-discharge characteristics of Comparative Battery Z2 and Battery A2 of the invention were compared. The characteristics of the former are shown in FIG. 3, and those of the latter are shown in FIG. 4.

The charge-discharge conditions and storage conditions were as follows.

Charge-Discharge Conditions

The charge-discharge conditions were the same as those in the experiment of the First Group of Examples.

Storage Conditions

Comparative Batteries Y2, Y3, Y6, and Y7 were set aside under the same conditions as described in the experiment in the First Group of Examples. Comparative Batteries Y1, Y4, and Y5 were set aside at 80° C. for 4 days.

Determination of Remaining Capacity

The remaining capacities were calculated in the same manner as described in the experiment of the First Group of Examples.

Analysis

As clearly seen from reviewing Table 3, in comparing Comparative Batteries Y5 to Y7 and Z2, which used the separator S1 having a pore volume of 456 μm·% and did not have a polymer layer on the positive electrode, it was confirmed that Comparative Batteries Y7 and Z2, which had an end-of-charge voltage of 4.35 V or higher (a positive electrode potential of 4.45 V or higher versus the potential of the lithium reference electrode) showed considerably lower remaining capacities than Comparative Batteries Y5 and Y6, which had an end-of-charge voltage of less than 4.35 V. In addition, it was confirmed that Comparative Batteries Y6, Y7, and Z2 showed such a behavior that the charge curve meandered during the recharge after the remaining capacity had been confirmed and the amount of charge increased significantly (see meandering portion 1 of FIG. 3, which shows the charge-discharge characteristics of Comparative Battery Z2). On the other hand, in comparing Comparative Batteries Y1, Y2, Y3 and Z1, which used the separator S5 having a pore volume of 1104 μm·% and did not have a polymer layer on the positive electrode, it was confirmed that the batteries did not easily cause a deterioration relative to Comparative Batteries Y5 to Y7 and Z2 having a low pore volume, but Comparative Battery Z1 having an end-of-charge voltage 4.40 V showed an abnormal charge behavior. In contrast, in Batteries A1 and A2 of the invention, the deterioration of the remaining capacity was lessened irrespective of the pore volume of the separator, and no abnormal charge behavior was observed.

It is believed that the results are attributed to the following reasons.

Generally, when the end-of-charge voltage is raised, the crystal structure of the positive electrode active material becomes unstable, allowing the dissolution of Co and Mn to occur more easily. In addition, raising the end-of-charge voltage results in a high oxidation state, allowing the decompo-

TABLE 3

| Battery (Separator) | Separator | | | | Positive Electrode | | | | End-of-charge voltage (Positive electrode potential verses potential of lithium reference electrode) (V) | Remaining capacity (%) | Abnormal charge behavior observed |
|---|---|---|---|---|---|---|---|---|---|---|---|
| | Average pore diameter (μm) | Film thickness (μm) | Porosity (%) | Pore volume [Film thickness × Porosity] (μm·%) | Polymer layer formed | Polymer layer Molecular weight of polymer | Amount of polymer (mass %) | Filling density of positive electrode active material layer (g/cc) | | | |
| Y1 (S5) | 0.6 | 23 | 48 | 1104 | No | — | — | 3.60 | 4.20 (4.30) | 77.2 | No |
| Y2 (S5) | | | | | No | — | — | | 4.30 (4.40) | 75.3 | No |
| Y3 (S5) | | | | | No | — | — | | 4.35 (4.45) | 72.1 | No |
| A1 (S5) | | | | | Yes | 800,000 | 3 | | 4.40 (4.50) | 82.6 | No |
| Z1 (S5) | | | | | No | — | — | | | 55.3 | Yes |
| Y4 (S1) | 0.1 | 12 | 38 | 456 | Yes | 800,000 | 3 | | 4.20 (4.30) | 66.3 | No |
| Y5 (S1) | | | | | No | — | — | | | 66.8 | No |
| Y6 (S1) | | | | | No | — | — | | 4.30 (4.40) | 70.0 | Yes |
| Y7 (S1) | | | | | No | — | — | | 4.35 (4.45) | 0.1 | Yes |
| A2 (S1) | | | | | Yes | 800,000 | 3 | | 4.40 (4.50) | 75.0 | No |
| Z2 (S1) | | | | | No | — | — | | | 0.1 | Yes | sition of the electrolyte salt to occur more easily, and it seems that, as a consequence, a salt containing fluorine such as LiPF$_6$ produces HF, which promotes the dissolution of Co and Mn. It is believed that in Comparative Batteries Y7 and Z2, which have high end-of-charge voltages and use a separator with a small pore volume, the dissolution of Co and Mn becomes evident for the just-noted reasons, resulting in the abnormal charge behavior and the decrease in remaining capacity.

In contrast, in the batteries of the invention, the polymer layer formed on the positive electrode surface functions as a filter, inhibiting the dissolved Co, Mn, and the like from migrating to the separator and the negative electrode, and therefore, Battery A2 of the invention, which has a small pore volume, as well as Battery A1 of the invention, which has a large pore volume, can suppress the decrease in remaining capacity and the occurrence of the abnormal charge. Moreover, it is believed that the presence of the polymer layer inhibits the decomposition of the electrolyte solution on the surface of the positive electrode active material layer.

It should be noted that in the cases of the end-of-charge voltage being 4.20 V, Comparative Battery Y4, which has the polymer layer, shows approximately the same remaining capacity as that of Comparative Battery Y5, which does not have the polymer layer, although both batteries use a separator with a small pore volume. This is believed to be because the modes of deterioration greatly differ between the case of an end-of-charge voltage of 4.20 V and the case of an end-of-charge voltage of 4.30 V, as far as the behaviors are compared between these cases.

The reason is thought to be as follows, although the following may still remain in the realm of speculation. It can be speculated that in the storage test with an end-of-charge voltage of 4.20 V, the burden on the structure of the positive electrode is not so great, and for that reason, the adverse effect resulting from the dissolution of Co from the positive electrode is small, although there is a little adverse effect arising from the decomposition of the electrolyte solution. Accordingly, almost no improvement effect resulting from the presence of the polymer layer is observed. In contrast, when the end-of-charge voltage (storage voltage) of the battery is higher, the stability of the crystal structure of the charged positive electrode becomes poorer, and moreover, the voltage becomes close to the limit of oxidation resistant potential of cyclic carbonates and chain carbonates, which are commonly used for lithium-ion batteries. Therefore, it can be speculated that the production of side reaction products and the decomposition of the electrolyte solution proceed more than expected with the voltages at which lithium-ion batteries have been used, and this consequently increases the damage to the negative electrode and the separator oxidized potential.

From the foregoing, it is believed that the advantageous effects of the present invention are exhibited only in the range of an end-of-charge voltage of 4.30 V or higher (a positive electrode potential of 4.40 V or higher versus the potential of a lithium reference electrode). It is also understood that the configuration of the present invention is particularly effective when the pore volume of the separator is 800 μm·% or less.

Third Group of Examples

The filling density of the positive electrode active material layer was varied to investigate the relationship between the filling density of the positive electrode active material layer and the storage performance in a charged state, using two types of the separator (S1 and S5) and setting the end-of-charge voltage at 4.40 V, and with the physical properties of the polymer layer formed on the surface of the positive electrode active material layer (the molecular weight of the polymer and the amount of the polymer) being fixed. The results are set forth below.

Example B

A battery was fabricated in the same manner as described in Example A1 of the First Group of Examples, except that the filling density of the positive electrode active material layer was set at 3.20 g/cc.

The battery thus prepared is hereinafter referred to as Battery B of the invention.

Comparative Example X1

A battery was fabricated in the same manner as described in Comparative Example Z1 of the First Group of Examples, except that the filling density of the positive electrode active material layer was set at 3.20 g/cc.

The battery fabricated in this manner is hereinafter referred to as Comparative Battery X1.

Comparative Example X2

A battery was fabricated in the same manner as described in Comparative Example Z2 of the First Group of Examples, except that the filling density of the positive electrode active material layer was set at 3.20 g/cc.

The battery fabricated in this manner is hereinafter referred to as Comparative Battery X2.

Comparative Example X3

A battery was fabricated in the same manner as described in Comparative Example Z2 of the First Group of Examples, except that the filling density of the positive electrode active material layer was set at 3.40 g/cc.

The battery fabricated in this manner is hereinafter referred to as Comparative Battery X3.

Comparative Example X4

A battery was fabricated in the same manner as described in Comparative Example Z2 of the First Group of Examples, except that the filling density of the positive electrode active material layer was set at 3.80 g/cc.

The battery fabricated in this manner is hereinafter referred to as Comparative Battery X4.

Experiment

The storage performance in a charged state (the remaining capacity after storage in a charged state) was studied for each of Battery B of the invention as well as Comparative Batteries X1 to X4. The results are shown in Table 4 below. Table 4 also shows the results for Batteries A1 and A2 of the invention and Comparative Batteries Z1 and Z2.

The charge-discharge conditions, the storage conditions, and the method for determining the remaining capacity were the same as described in the experiment in the First Group of Examples.

TABLE 4

| Battery (Separator) | Separator Average pore diameter (μm) | Film thickness (μm) | Porosity (%) | Pore volume [Film thickness × Porosity] (μm·%) | Polymer layer formed | Polymer layer Molecular weight of polymer | Amount of polymer (mass %) | Positive electrode Filling density of positive electrode active material layer (g/cc) | End-of-charge voltage (Positive electrode potential verses potential of lithium reference electrode) (V) | Remaining capacity (%) | Abnormal charge behavior observed |
|---|---|---|---|---|---|---|---|---|---|---|---|
| B (S5) | 0.6 | 23 | 48 | 1104 | Yes | 800,000 | 3 | 3.20 | 4.40 | 80.9 | No |
| X1 (S5) | | | | | No | — | — | | (4.50) | 77.9 | Yes |
| A1 (S5) | | | | | Yes | 800,000 | 3 | 3.60 | | 82.6 | No |
| Z1 (S5) | | | | | No | — | — | | | 55.3 | Yes |
| X2 (S1) | 0.1 | 12 | 38 | 456 | No | — | — | 3.20 | | 45.5 | Yes |
| X3 (S1) | | | | | No | — | — | 3.40 | | 0.1 | Yes |
| A2 (S1) | | | | | Yes | 800,000 | 3 | 3.60 | | 75.0 | No |
| Z2 (S1) | | | | | No | — | — | | | 0.1 | Yes |
| X4 (S1) | | | | | No | — | — | 3.80 | | 0.1 | Yes |

As clearly seen from Table 4, the results in the cases of using the separator S5 having a pore volume of 1104 μm·% are as follows. When the positive electrode active material layer has a filling density of 3.20 g/cc, a certain degree of remaining capacity is achieved by not only Battery B of the invention but also by Comparative Battery X1. On the other hand, when the positive electrode active material layer has a filling density of 3.60 g/cc, Comparative Battery Z1 shows a considerably lower remaining capacity than that of Battery A1 of the invention, while Battery A2 of the invention exhibits a certain degree of remaining capacity.

In addition, the results in the cases of using the separator S1 having a pore volume of 456 μm·% are as follows. When the positive electrode active material layer has a filling density of 3.20 g/cc, a certain degree of remaining capacity is achieved even by Comparative Battery X2. On the other hand, when the positive electrode active material layer has a filling density of 3.40 g/cc or greater, Comparative Batteries X3, X4, and Z2 show considerably lower remaining capacities than that of Battery A2 of the invention, while Battery A2 of the invention exhibits a certain degree of remaining capacity.

This phenomenon is believed to be accounted for by the surface area of the positive electrode active material layer that comes in contact with the electrolyte solution and the degree of deterioration of the location where side reactions occur. Specifically, when the filling density of the positive electrode active material layer is low (less than 3.40 g/cc), the deterioration proceeds uniformly over the entire region, not locally, so the deterioration does not significantly affect the charge-discharge reactions after storage. In contrast, when the filling density is high (3.40 g/cc or higher), the deterioration takes place mainly in the outermost surface layer, so the intrusion and diffusion of lithium ions into the positive electrode active material during discharge become the rate-determining events, and therefore, the degree of deterioration becomes large in the comparative batteries, which do not have the polymer layer; on the other hand, in the batteries of the invention, which have the polymer layer, deterioration in the outermost surface layer is suppressed because of the presence of the polymer layer, so the intrusion and diffusion of lithium ions into the positive electrode active material during discharge do not become the rate-determining events, and the degree of deterioration becomes small.

In addition, the abnormal charge behavior that was mentioned in the experiment in the Second Group of Examples was observed in Comparative Battery Z1, Z2, and X1 to X4, while no such abnormal charge behavior was observed in Batteries A1, A2 and B of the invention.

From the foregoing results, it is demonstrated that the advantageous effects of the present invention are particularly evident when the positive electrode active material layer has a filling density of 3.40 g/cc or greater.

Fourth Group of Examples

The physical properties of the polymer layer formed on the surface of the positive electrode active material layer (the molecular weight of the polymer) were varied to investigate the relationship between the molecular weight of the polymer and the storage performance in a charged state, with the end-of-charge voltage and the filling density of the positive electrode active material layer being fixed at 4.40 V and 3.60 g/cc, respectively, and with the use of the separator S1. The results are set forth below.

Comparative Example W

A battery was fabricated in the same manner as described in Example A1 of the First Group of Examples, except that the polymer solution used for forming the polymer layer of the positive electrode contained a polymer composed of PVdF (copolymer with HFP-PTFE: molecular weight 300,000).

The battery thus fabricated is hereinafter referred to as Comparative Battery W.

Experiment

The storage performance in a charged state (remaining capacity after storage in a charged state) was studied for Comparative Battery W. The results are shown in Table 5 below. Table 5 also shows the results for Battery A1 of the invention and Comparative Battery Z1.

The charge-discharge conditions, the storage conditions, and the method for determining the remaining capacity were the same as described in the experiment in the First Group of Examples.

TABLE 5

| Battery (Separator) | Separator | | | | Positive electrode | | | Filling density of positive electrode active material layer (g/cc) | End-of-charge voltage (Positive electrode potential verses potential of lithium reference electrode) (V) | Remaining capacity (%) |
|---|---|---|---|---|---|---|---|---|---|---|
| | Average pore diameter (μm) | Film thickness (μm) | Porosity (%) | Pore volume [Film thickness × Porosity] (μm %) | Coating layer | | | | | |
| | | | | | Polymer layer formed | Molecular weight of polymer | Amount of polymer (mass %) | | | |
| A1 (S1) | 0.6 | 23 | 48 | 1104 | Yes | 800,000 or greater | 3 | 3.60 | 4.40 (4.50) | 82.6 |
| Z1 (S1) | | | | | No | — | — | | | 55.3 |
| W (S1) | | | | | Yes | 300,000 | 3 | | | 5.3 |

Analysis

As clearly seen from Table 5, the results of the storage test in a charged state demonstrate that Battery A1 of the invention, in which the polymer layer is formed on the surface of the positive electrode active material layer and the molecular weight of the polymer is 800,000 or greater, exhibits a significant improvement in remaining capacity after storage in a charged state over Comparative Battery Z1, in which no polymer layer is formed, and over Comparative Battery W, in which the polymer layer is formed on the surface of the positive electrode active material layer but the molecular weight of the polymer is 300,000 (the polymer is PVdF).

It is believed that Battery A1 of the invention exhibits a higher remaining capacity than not only Comparative Battery Z1, in which no polymer layer is formed, but also Comparative Battery W, in which a polymer layer is formed due to the following reasons. The type of polymer used in Battery A1 of the invention has crosslinked groups by oxetanyl groups and a high molecular weight, and therefore does not easily dissolve in the electrolyte solution. On the other hand, PVdF, used in Comparative Battery W, does not have a cross-linked structure and also has a low molecular weight, so it tends to dissolve in the electrolyte solution easily. Therefore, formation of the polymer layer on the surface of the positive electrode active material layer is difficult, and the advantageous effect of improving the remaining capacity does not emerge sufficiently. It may seem possible to use a PVdF that has a high molecular weight, but in that case, other problems arise such that the swelling capability with the electrolyte solution lowers and there is no solvent for dissolving the PVdF during the coating process. Therefore, in reality, it is difficult to cast a polymer having a high molecular weight in advance.

For this reason, as the polymer used in the present invention, it is preferable to use a material that initially has a relatively large molecular weight and further polymerizes by crosslinking so that its insolubility with the electrolyte solution is enhanced. On the other hand, polymerization of monomers with several hundred units results in a polymer that easily infiltrates into the interior of the electrode, which is likely to cause the problems of an increase in electrode resistance and a decrease in the permeability of the electrolyte solution. Moreover, since such monomers have many crosslinking points, portions that do not undergo the reaction can easily remain, which is highly likely to adversely affect the battery performance. For these reasons, it is desirable that a polymer material whose molecular weight has been increased to a certain degree in advance to enhance its purity should be crosslinked further on the electrode so that its molecular weight can be further increased.

Here, it is desirable to adopt a crosslinking reaction technique other than radical polymerization for the crosslinking reaction on the electrode, because radical polymerization has already been used in increasing the molecular weight and it is very difficult to carry out further radical polymerization after the reaction has been stopped (since it is difficult to selectively increase the molecular weight and control the radical reaction with the crosslinking reaction in a multi-staged manner). Therefore, it is preferable that the crosslinking reaction be performed using a polymerization technique such as cationic polymerization and dehydration condensation polymerization. Specifically, it is desirable to use cationic polymerization using a monomer having an oxetanyl or an epoxy functional group, or having a substituent which forms urethane bonds resulting from dehydration condensation of polyfunctional isocyanate-hydroxyl groups (polymer molecules are partially linked to obtain insolubility with the electrolyte solution).

It is essential that the polymer material that is necessary for the present invention contain these crosslinking functional groups, but it is also necessary to form a composition in which the affinity with the electrolyte solution (necessary for the mobility of lithium ions and swelling of the polymer), film-formability (to form a uniform film), and insolubility with the electrolyte solution (to prevent the dissolution into the electrolyte solution) are well-balanced. Examples of the types of monomers that enhance the affinity with the electrolyte solution include acrylate monomers and methacrylate monomers. Examples of the types of monomers that enhance the film-formability include monomers that have long chain alkyl groups and monomers that have a styrene structure. Examples of the types of monomers that enhance the insolubility with the electrolyte solution include monomers having crosslinking functional groups that achieve the above-described increase in molecular weight. In addition to these, various types of monomers may be used. By combining these monomers and effecting polymerization at an appropriate blending composition, a prepolymer may be synthesized. It is desirable that the prepolymer be synthesized using radical polymerization, and various combinations of various types of monomers that respectively have necessary functional groups. Thereby, a polymer that has insolubility and an appropriate degree of swelling capability can be obtained.

It has also been confirmed that when using a polymer with a molecular weight of 400,000 and a polymer with a molecular weight of 600,000 as well, the dissolution rates of the polymers are large and the polymers dissolve into the electrolyte solution. If the polymer dissolves into the electrolyte solution in this way, various problems arise in addition to the problem that the advantageous effects of the present invention cannot be obtained. A problem in the case of an aluminum laminate battery is that when sealing the battery by thermal welding after filling the electrolyte solution into the spirally-wound electrode assembly, the sealing performance of the laminate film becomes considerably poor if the polymer exists in the sealing part. Another problem is the gas generation that occurs during high-temperature storage. Accordingly, it is essential that the molecular weight of the polymer be 800,000 or greater.

Usually, the amount of the polymer that dissolves into an organic solvent reduces due to a high molecular weight, but if the molecular weight is too large (when the molecular weight is approximately 1,000,000 or greater) it is difficult to determine the molecular weight accurately (even with the use of the previously-mentioned GPC, the determination is difficult). In view of this, the physical property values of the polymer may be specifically determined by immersing the polymer in a mixed organic solvent (for example, a mixed solvent of 1:1 volume ratio of EC and DEC) for 24 hours to extract the polymer, then measuring the amount of the polymer dissolved into the organic solvent, and calculating the dissolution ratio of the polymer using the following equation (4). It should be noted, however, that the organic solvents are not limited to the above-described examples, but any organic solvent may be used if the solvent shows substantially the same degree of extraction rate.

Dissolution ratio(mass %)=Mass of the polymer contained in the organic solvent/Total mass of the polymer 100.  (4)

Fifth Group of Examples

The amount of the polymer (the coating amount of the polymer) formed on the surface of the positive electrode active material layer was varied to investigate the relationship between the amount of the polymer used and the storage performance in a charged state, with the end-of-charge voltage and the filling density of the positive electrode active material layer being fixed at 4.40 V and 3.60 g/cc, respectively, and with the use of the separator S1. The results are as set forth below.

Example C

A battery was fabricated in the same manner as described in Example A1 of the First Group of Examples, except that the amount of the polymer added was 5 mass % (the coating amount of the polymer was $3.30 \times 10^{-4}$ g/cm) in the polymer solution used for forming the polymer layer of the positive electrode.

The battery thus fabricated is hereinafter referred to as Battery C of the invention.

Experiment

The storage performance in a charged state (remaining capacity after storage in a charged state) was studied for Battery C of the invention. The results are shown in Table 6 below. Table 6 also shows the results for Battery A1 of the invention and Comparative Battery Z1.

The charge-discharge conditions, the storage conditions, and the method for determining the remaining capacity were the same as described in the experiment in the First Group of Examples.

TABLE 6

| Battery (Separator) | Separator | | | | Positive Electrode | | | | Filling density of positive electrode active material layer (g/cc) | End-of-charge voltage (Positive electrode potential verses potential of lithium reference electrode) (V) | Remaining capacity (%) |
|---|---|---|---|---|---|---|---|---|---|---|---|
| | Average pore diameter (μm) | Film thickness (μm) | Porosity (%) | Pore volume [Film thickness × Porosity] (μm %) | Polymer layer formed | Coating layer | | | | | |
| | | | | | | Molecular weight of polymer | Amount of polymer (mass %) | Coating amount of polymer ($\times 10^{-4}$ g/cm$^2$) | | | |
| A1 (S1) | 0.6 | 23 | 48 | 1104 | Yes | 800,000 | 3 | 1.73 | 3.60 | 4.40 (4.50) | 82.6 |
| Z1 (S5) | | | | | Yes | 800,000 | 5 | 3.30 | | | 82.5 |
| W (S1) | | | | | No | — | — | — | | | 55.3 |

Analysis

As clearly seen from Table 6, a higher remaining capacity than that of Comparative Battery Z1 was obtained not only by Battery A of the invention, in which the amount of the polymer is 3 mass %, but also by Battery C of the invention, in which the amount of the polymer is 5 mass %.

Here, it is preferable that the polymer layer be thicker (the coating amount of the polymer [the amount of the polymer] is greater) from the viewpoint of preventing the migration of Co, Mn, and the like. It has been confirmed that when the amount of the polymer is made greater than that of Battery C of the invention, the remaining capacity accordingly become higher. Nevertheless, an increase in the amount of the polymer added brings about a corresponding increase in the internal resistance of the battery. For this reason, regarding the battery capacity before storage, it was confirmed that Battery C of the invention, in which the amount of polymer was 5 mass %, had a battery capacity (discharge ratio at 1.0 It) of only 89.0% of that of Comparative Battery Z1, in which no polymer layer was formed. It was also confirmed that a battery in which the amount of the polymer was 10 mass % showed a battery capacity (discharge ratio at 1.0 It) of only 31.8%.

These data demonstrate that the coating amount of the polymer should preferably be $3.3 \times 10^{-4}$ g/cm$^2$ or less, in order to prevent the problem of the deterioration in the discharge capacity that originates from a large film thickness of the polymer layer and the consequent increase in the internal resistance of the battery.

OTHER EMBODIMENTS (1) Although the types of the solvents and polymer materials for preparing the polymer solution are not particularly limited, it is preferable to use a solvent that is suitable for the polymer used. In particular, the positive electrode is made using NMP-PVDF, so if a solvent in which PVdF is soluble is used, the positive electrode itself may be damaged. For that reason, NMP and acetone are undesirable.

(2) The positive electrode active material is not limited to lithium cobalt oxide. Other usable materials include, for example, lithium composite oxides containing cobalt or manganese, such as lithium cobalt-nickel-manganese composite oxide, lithium aluminum-nickel-manganese composite oxide, and lithium aluminum-nickel-cobalt composite oxide, as well as spinel-type lithium manganese oxides. Preferably, the positive electrode active material shows a capacity increase by being charged at a higher voltage than 4.3 V verses the potential of a lithium reference electrode, and preferably has a layered structure. Moreover, such positive electrode active materials may be used either alone or in combination with another positive electrode active material.

(3) The method for mixing the positive electrode mixture is not limited to wet-type mixing techniques, and it is possible to employ a method in which a positive electrode active material and a conductive agent are dry-blended in advance, and thereafter PVdF and NMP are mixed and agitated together.

(4) The negative electrode active material is not limited to graphite described above. Various other materials may be employed, such as coke, tin oxides, metallic lithium, silicon, and mixtures thereof, as long as the material is capable of intercalating and deintercalating lithium ions.

(5) The lithium salt in the electrolyte solution is not limited to $LiPF_6$, and various other substances may be used, including, for example, $LiBF_4$, $LiN(SO_2CF_3)_2$, $LiN(SO_2C_2F_5)_2$, $LiPF_{6-x}(CnF_{2n+1})_x$ (wherein $1<x<6$ and $n=1$ or $2$), which may be used either alone or in combination. The concentration of the lithium salt is not particularly limited, but it is preferable that the concentration of the lithium salt be restricted in the range of from 0.8 moles to 1.5 moles per 1 liter of the electrolyte solution. The solvents for the electrolyte solution are not particularly limited to ethylene carbonate (EC) and diethyl carbonate (DEC) mentioned above, and preferable solvents include carbonate solvents such as propylene carbonate (PC), γ-butyrolactone (GBL), ethyl methyl carbonate (EMC), and dimethyl carbonate (DMC). More preferable is a combination of a cyclic carbonate and a chain carbonate.

The present invention is suitable for driving power sources for mobile information terminals such as mobile telephones, notebook computers, and PDAs, especially for use in applications that require a high capacity. The invention is also expected to be used for high power applications that require continuous operations under high temperature conditions, such as HEVs and power tools, in which the battery operates under severe operating environments.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and is not intended to limit the invention as defined by the appended claims and their equivalents.

This application claims priority of Japanese patent application No. 2006-074558 filed Mar. 17, 2006, which is incorporated herein by reference.

What is claimed is:

1. A non-aqueous electrolyte secondary battery comprising:
   a positive electrode having a positive electrode active material layer comprising a positive electrode active material containing at least cobalt or manganese, the positive electrode having an end-of-charge potential of 4.40 V or higher versus the potential of a lithium reference electrode;
   a polymer layer formed on a surface of the positive electrode active material layer, the polymer layer composed of a polymer having a partially cross-linked structure and a molecular weight of 800,000 or greater;
   a negative electrode having a negative electrode active material;
   a separator interposed between the positive electrode and the negative electrode;
   an electrode assembly comprising the positive electrode, the negative electrode, and the separator; and
   a non-aqueous electrolyte impregnated in the electrode assembly.

2. The non-aqueous electrolyte battery according to claim 1, wherein the polymer layer has a mass per unit area of the positive electrode active material layer of $3.3 \times 10^{-4}$ g/cm$^2$ or less.

3. The non-aqueous electrolyte battery according to claim 2, wherein the product of separator thickness x (μm) and separator porosity y (%) is 1500 (μm·%) or less.

4. The non-aqueous electrolyte battery according to claim 3, wherein the product of x and y is 800 (μm·%) or less.

5. The non-aqueous electrolyte battery according to claim 4, wherein the positive electrode active material layer has a filling density of 3.40 g/cc or greater.

6. The non-aqueous electrolyte battery according to claim 5, wherein the positive electrode active material contains at least lithium cobalt oxide containing aluminum or magnesium in a solid solution, and zirconia is attached on the surface of the lithium cobalt oxide.

7. The non-aqueous electrolyte battery according to claim 6, wherein the positive electrode has an end-of-charge potential of 4.45 V or higher versus the potential of a lithium reference electrode.

8. The non-aqueous electrolyte battery according to claim 5, wherein the positive electrode has an end-of-charge potential of 4.45 V or higher versus the potential of a lithium reference electrode.

9. The non-aqueous electrolyte battery according to claim 4, wherein the positive electrode active material contains at least lithium cobalt oxide containing aluminum or magnesium in a solid solution, and zirconia is attached on the surface of the lithium cobalt oxide.

10. The non-aqueous electrolyte battery according to claim 4, wherein the positive electrode has an end-of-charge potential of 4.45 V or higher versus the potential of a lithium reference electrode.

11. The non-aqueous electrolyte battery according to claim 2, wherein the positive electrode active material layer has a filling density of 3.40 g/cc or greater.

12. The non-aqueous electrolyte battery according to claim 2, wherein the positive electrode active material contains at least lithium cobalt oxide containing aluminum or magnesium in a solid solution, and zirconia is attached on the surface of the lithium cobalt oxide.

13. The non-aqueous electrolyte battery according to claim 2, wherein the positive electrode has an end-of-charge potential of 4.45 V or higher versus the potential of a lithium reference electrode.

14. The non-aqueous electrolyte battery according to claim 1, wherein the product of separator thickness x (μm) and separator porosity y (%) is 1500 (μm·%) or less.

15. The non-aqueous electrolyte battery according to claim 14, wherein the product of x and y is 800 (μm·%) or less.

16. The non-aqueous electrolyte battery according to claim 15, wherein the positive electrode active material layer has a filling density of 3.40 g/cc or greater.

17. The non-aqueous electrolyte battery according to claim 1, wherein the positive electrode active material layer has a filling density of 3.40 g/cc or greater.

18. The non-aqueous electrolyte battery according to claim 1, wherein the positive electrode active material contains at least lithium cobalt oxide containing aluminum or magnesium in a solid solution, and zirconia is attached on the surface of the lithium cobalt oxide.

19. The non-aqueous electrolyte battery according to claim 1, wherein the positive electrode has an end-of-charge potential of 4.45 V or higher versus the potential of a lithium reference electrode.

* * * * *